(12) United States Patent
Pimpinella et al.

(10) Patent No.: US 7,455,460 B2
(45) Date of Patent: Nov. 25, 2008

(54) FIBER OPTIC CONNECTOR WITH DOUBLE-CLAD STUB FIBER

(75) Inventors: Richard J. Pimpinella, Frankfort, IL (US); Albert Brunsting, Naperville, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 11/683,809

(22) Filed: Mar. 8, 2007

(65) Prior Publication Data

US 2008/0219624 A1    Sep. 11, 2008

(51) Int. Cl.
    *G02B 6/38* (2006.01)
(52) U.S. Cl. .......................... 385/55; 385/52; 385/53; 385/54; 385/60; 385/72; 385/78; 385/92; 385/124; 385/126; 385/127; 385/128
(58) Field of Classification Search ......... 385/126–128, 385/52–92, 124
    See application file for complete search history.

(56) References Cited

U.S. PATENT DOCUMENTS

| | | | |
|---|---|---|---|
| 4,206,967 A | 6/1980 | Onoda et al. | |
| 4,435,040 A | 3/1984 | Cohen et al. | |
| 4,447,127 A | 5/1984 | Cohen et al. | |
| 4,838,643 A | 6/1989 | Hodges et al. | |
| 5,179,603 A * | 1/1993 | Hall et al. | 385/24 |
| 5,241,613 A * | 8/1993 | Li et al. | 385/78 |
| 5,412,745 A * | 5/1995 | Weidman et al. | 385/43 |
| 5,757,993 A * | 5/1998 | Abe | 385/34 |
| 5,966,490 A | 10/1999 | Minns et al. | |
| 6,157,763 A | 12/2000 | Grubb et al. | |
| 6,345,141 B1 | 2/2002 | Grubb et al. | |
| 6,422,764 B1 * | 7/2002 | Marrs | 385/81 |
| 6,428,217 B1 | 8/2002 | Giltner | |
| 6,434,302 B1 | 8/2002 | Fidric et al. | |
| 6,483,973 B1 | 11/2002 | Mazzarese et al. | |
| 6,487,006 B1 | 11/2002 | Chen | |
| 6,687,445 B2 | 2/2004 | Carter et al. | |
| 7,011,454 B2 * | 3/2006 | Caveney et al. | 385/87 |
| 7,034,995 B2 | 4/2006 | Provost et al. | |
| 7,046,875 B2 | 5/2006 | Gonthier et al. | |

(Continued)

FOREIGN PATENT DOCUMENTS

EP    1329750 A3    2/2005

*Primary Examiner*—Brian Healy
*Assistant Examiner*—Hung Lam
(74) *Attorney, Agent, or Firm*—Robert A. McCann; Zachary J. Smolinski

(57) ABSTRACT

A fiber optic connector having a double-clad specialty optical stub fiber with a deep index core-to-inner-cladding profile and a raised index outer-cladding profile. The double-clad optical stub fiber abuts against a single-clad field optical fiber of the single-mode type to form an interface across which the primary mode traverses without significantly interfering with higher-order modes. The ratio of the radius of the inner cladding to the radius of the core of the stub fiber is less than 6.5:1. The index profile of the refractive index of the inner cladding is deep relative to the refractive index of the core to confine the primary mode within the core. The raised refractive index of the outer-cladding pulls the higher-order modes deeper into that region, reducing interference with the primary mode. The respective core diameters of the field and stub fibers are matched to avoid mode-field diameter mismatch.

16 Claims, 1 Drawing Sheet

U.S. PATENT DOCUMENTS 7,054,061 B2 5/2006 Arbore et al.
2001/0002220 A1* 5/2001 Throckmorton et al. ....... 385/66
2005/0036744 A1 2/2005 Caveney et al.
2006/0088262 A1 4/2006 Berkey et al.

* cited by examiner

FIBER OPTIC CONNECTOR WITH DOUBLE-CLAD STUB FIBER

FIELD OF THE INVENTION

The present invention relates generally to fiber optic connectors, and, more particularly, to a field-terminated, pre-polished fiber optic connector having a double-clad stub fiber for minimizing optical interference effects caused by excitation of higher-order modes.

BACKGROUND OF THE INVENTION

Field-terminated pre-polished fiber optic connectors include an interface at which two optical fibers, a field optical fiber ("field fiber") and an internal stub optical fiber ("stub fiber"), are coupled. Such connectors include a pre-polished front face that enables a connection with another compatible fiber optic connector. In such a connector, the stub fiber is essentially disposed between two interfaces: the field fiber-stub fiber interface, and the connector interface with the compatible connector at the pre-polished front face.

Ideally, all of the light energy passing through the core of a single-mode field fiber will continue unimpeded across the interface into the core of the stub fiber in the pre-polished fiber optic connector. In this ideal scenario, the interface between the field fiber and the stub fiber is said to have a coupling efficiency, $\eta_1$, equal to one, because all light traveling in the core of the field fiber becomes coupled into a primary mode, designated as $LP_{01}$ for single-mode fibers, and travels through the stub fiber core. But in reality, optical interference effects occur as a result of misalignment of the cores of the field and stub fibers or mismatch of the mode-field diameter (MFD) or optical-power distribution for the field and stub fibers. This misalignment or mismatch excites unwanted higher-order coherent modes, such as the $LP_{11}$ and $LP_{02}$ modes for single-mode fibers, which interfere with one another within the short length of the stub fiber. This interference can be constructive or destructive, which, in the latter case, causes an overall increase in insertion loss of the connector interface.

A need exists for a pre-polished quick-terminated fiber optic connector that overcomes these and other problems.

SUMMARY OF THE INVENTION

A field-terminated pre-polished fiber optic connector assembly for terminating a single-clad optical field fiber includes a double-clad optical stub fiber and an alignment member. The alignment member receives the cleaved end of the field-terminated optical field fiber, which abuts against an end of the double-clad optical stub fiber forming an interface at the point of abutment. The double-clad optical stub fiber includes a core having a radius $r_c$, an inner cladding having a radius $r_1$, and an outer cladding having a radius $r_2$. The ratio $r_1 : r_c$ is less than 6.5:1. The refractive index of the inner cladding is down-doped to result in an effective refractive index that is at least 0.0025 lower than that of the core but higher than that of the outer cladding's refractive index. The mode field diameter (MFD) of the double-clad optical stub fiber approximately matches the MFD of the field fiber. In one implementation, the optical field fiber and double-clad optical stub fiber are of the single-mode type. In another implementation, the optical field fiber and double-clad optical stub fiber are of the multimode type. The optical field fiber can also be a double-clad fiber.

A method of terminating a single-clad optical field fiber includes positioning an end of a field fiber in a fiber optic connector assembly such that that end contacts an end of a double-clad optical stub fiber that is at least partially disposed within the fiber optic connector assembly.

DETAILED DESCRIPTION OF THE ILLUSTRATED EMBODIMENTS

Figure 1:
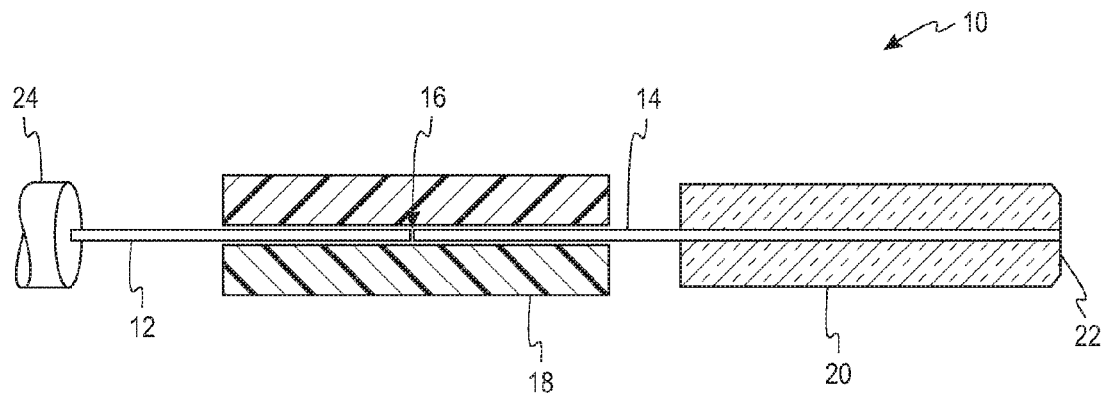
FIG. 1 is a cross-sectional side illustration of an exemplary field-terminated pre-polished fiber optic connector 10 for terminating a field fiber 12, according to an aspect of the present invention.

FIG. 1 is a cross-sectional side illustration of a field-terminated pre-polished fiber optic connector 10 for terminating a field fiber 12, according to an aspect of the present invention. The field fiber 12 is a single-mode optical fiber having a single cladding. The connector 10 couples together the field fiber 12 with a stub fiber 14, which forms an interface 16 where the two fibers 12, 14 abut against one another within the connector 10. The connector 10 is optionally of the type generally described in commonly assigned, U.S. Pat. No. 7,011,454, entitled "Reversible Fiber Optic Stub Fiber Connector," issued Mar. 14, 2006, though other fiber optic connectors can be used. An alignment member 18 may comprise v-groove planks for aligning ends of the fibers 12, 14 in a fixed relationship with one another. A ferrule 20 surrounds part of the stub fiber 14, and a pre-polished end of the stub fiber 14 is positioned at a pre-polished front face 22 of the ferrule 20 so that together they can be received in an appropriately configured port in a patch panel or other device. A conventional buffer 24 surrounds part of the field fiber 12.

Light passing through the core of the field fiber 12 is in a primary or fundamental mode ($LP_{01}$ for single-mode fibers), which describes the radial and azimuthal electromagnetic field distribution in an optical fiber. At the interface 16, there may be either a slight misalignment of the respective cores of the field fiber 12 and the stub fiber 14 when the two are brought together during installation or a mismatch in the mode-field diameter (MFD) across the respective exposed end faces of the fibers 12, 14. Core misalignment at the interface results in excitement of unwanted higher-order modes. When the power distribution of the light energy in the field fiber 12 is radially Gaussian, as exhibited in the $LP_{01}$ mode, light energy near the core-cladding interface excites additional higher-order modes, such as the second-order mode $LP_{11}$ and third-order mode $LP_{02}$, which can result in modal interference at the pre-polished front face 22. The excited modes of light are coherent and travel in different paths according to different propagation constants, so when they reach the front face 22 at the end of the stub fiber 14, depending upon the phase difference, the modes can interfere with each other. This interference is wavelength-dependent, and can be constructive (when the electric field of the modes combine together) or destructive (when the electric field from one mode cancels out electric field from another). An undesirable increase in insertion loss is caused by destructive interference.

Core misalignment can be minimized to an extent by enforcing tight geometries in the fibers, such as by incorporating into the connector 10 a stub fiber with a high concentricity, K (or low concentricity error). However, even use of a high-concentricity stub fiber may not eliminate undesirable modal interference altogether, so the present invention proposes a double-clad specialty fiber 14 having a relatively narrow ratio between the respective radii of the inner cladding and the core and a deep index-of-refraction depression for the inner cladding relative to the core and the outer cladding. The combination of the narrow inner cladding-to-core radii ratio and deep core-to-inner cladding index depression substantially confines the primary mode within the core of the fiber 14 and allows the unwanted higher-order modes to extend toward the raised-index outer cladding region, thereby reducing modal overlap in the core. Preferably, the stub fiber 14 has a high concentricity (or low concentricity error) no greater than 0.5 μm to minimize interference caused by a misalignment of the respective cores of the field fiber 12 and the stub fiber 14.

Figure 2:
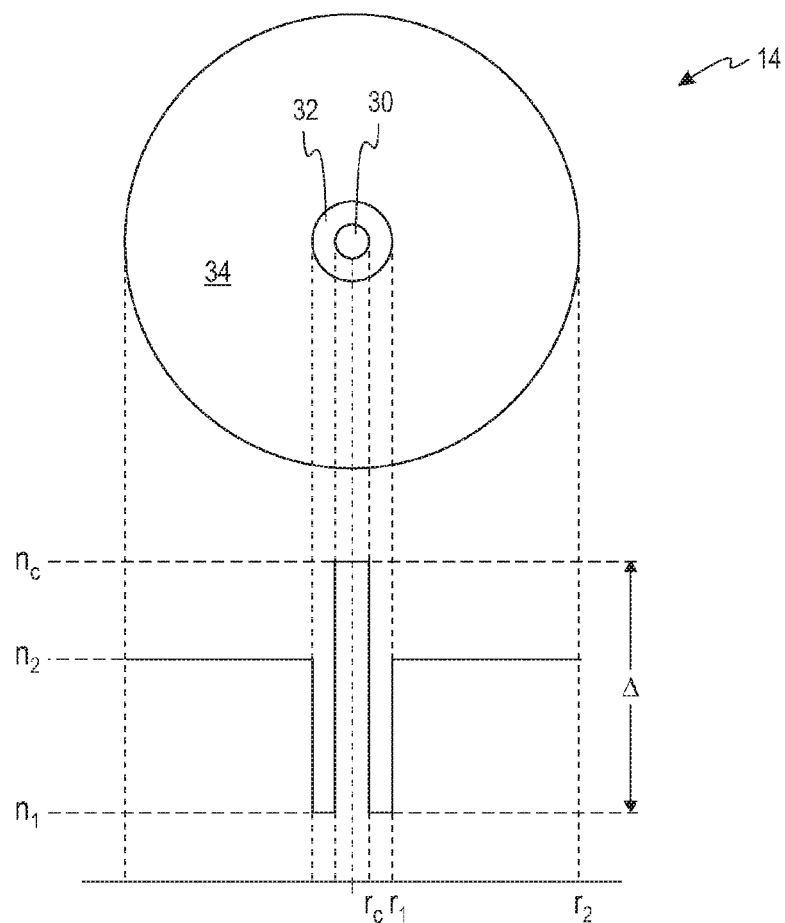
FIG. 2 is a cross-sectional illustration of a double-clad stub fiber 14 that is incorporated in the exemplary fiber optic connector 10 of FIG. 1 and an index profile of the respective indices of refraction of the core and claddings of the double-clad stub fiber 14.

FIG. 2 is a cross-sectional illustration of the double-clad stub fiber 14 having a core 30, an inner cladding 32, and an outer cladding 34, each having a respective index of refraction $n_c$, $n_1$, and $n_2$ and a respective radius $r_c$, $r_1$, and $r_2$. In the double-clad stub fiber 14 shown in FIG. 2, the refractive index of the inner cladding 32 is less than the refractive indices of both the core 30 and the outer cladding 34. The refractive index of the inner cladding 32 is down-doped with, for example, Fluorine or Boron, to result in an effective refractive index that is at least 0.0025 lower than that of the core 30. Instead of down-doping the refractive index of the inner cladding 32, the refractive index of the core 30 can be up-doped with, for example, Germanium. The raised refractive index of the outer cladding 34, $n_2$, is less than the refractive index of the core 30, $n_c$. The double-clad stub fiber 14 differs from commonly available depressed-cladding fiber in that the clad-to-core ratios produce the desired effect as discussed herein. The deep index depression between the respective refractive indices of the inner cladding 32 and the core 30 substantially contains the primary mode within the core, while the raised refractive index of the outer cladding 34 allows the higher-order modes to extend over a larger diameter making them more likely to interact with the outer cladding 34.

It has been found that if the ratio between the radii of the inner cladding and the core of a double-clad fiber is too large, higher-order modes will tend to be contained within the core resulting in high insertion loss due to modal interference. The ratio for the radii of the inner cladding 32 and the core 30 ($r_1$:$r_c$) is less than 6.5:1. A preferred ratio for the radii of the inner cladding 32 and the core 30 is on the order of 4.5:1. Other such ratios of less than 6.5:1, such as 5.5:1 and 3.5:1, can also be made to adequately contain the primary mode within the core 30 while spreading the higher-order modes to the outer cladding 34 by adjusting the refractive indices. Because the energy in the higher-order modes is concentrated a distance away from the optic axis, their energies tend to extend further into the outer cladding 34.

A deep core-to-inner cladding index depression is desirable to contain the primary mode within the core 30. The depth of this depression is typically characterized by the relative refractive index difference, called Δ, which is given by the following equation:

$$\Delta = \frac{n_c - n_1}{n_2} \cdot 100\%,$$

where $n_c$ is the refractive index of the core 30, $n_1$ is the refractive index of the inner cladding 32, and $n_2$ is the refractive index of the outer cladding 34. The relative refractive index difference, Δ, is typically expressed as a percentage. Preferably, Δ is at least about 0.4% but no greater than 2.5%.

As a result, the overall index profile of the stub fiber 14 resembles a narrow and deep refractive-index trench. The narrow and deep depression profile confines the primary mode without also confining undesired quantities of the higher-order modes. Those higher-order modes will tend to spread to the raised outer cladding 34 where they are contained by the raised index ring of the outer cladding 34.

Preferably, the diameter of the core 30 of the double-clad stub fiber 14 matches the core diameter of the field fiber 12, thereby matching the MFD of both fibers 12, 14. As a result, direct overlap between the field fiber 12 and the stub fiber 14 does not increase insertion loss or multi-path interference. In one embodiment, the stub fiber 14 is a single-mode fiber like the field fiber 12.

The illustrated and above-described embodiments of the invention are exemplary only and are not intended to limit the scope of protection in any way. To the contrary, the invention is considered to include embodiments not specifically shown or described herein. For example, although the ferrule 20 is shown adjacent to the alignment member 18 in FIG. 1 with the interface 16 within the alignment member 18, in other implementations, the interface between the field and stub fibers 12, 14 could be made within a ferrule, such as shown in the fiber optic connector described in commonly assigned U.S. Pat. No. 6,604,867. The style of the connector 10 can be of the LC, SC, FJ, ST, or MTP-type. Similarly, while in the embodiments described above, the field and stub fibers 12, 14 are of the single-mode type, the present invention also contemplates the field and stub fibers 12, 14 being of the multimode type. Additionally, while the field fiber 12 is described as a single-clad fiber, it can alternatively be a double-clad fiber, just like the stub fiber 14, such as used in a dispersion-shifted fiber or depressed clad fiber for bending sensitivity. Finally, in addition to the stub fiber 14 having a high concentricity, K, the field fiber 12 could also have a high concentricity for better alignment and less offset between the cores of the field and stub fibers 12, 14. Or, the stub fiber 14 may have a typical concentricity.

While particular embodiments and applications of the present invention have been illustrated and described, it is to be understood that the invention is not limited to the precise construction and compositions disclosed herein and that various modifications, changes, and variations may be apparent from the foregoing descriptions without departing from the invention.

What is claimed is:

1. A field-terminated pre-polished fiber optic connector assembly for terminating a field fiber, comprising:
   a double-clad optical stub fiber, said double-clad stub fiber including a core having an index of refraction $n_c$, an inner cladding having an index of refraction $n_1$, and an outer cladding having an index of refraction $n_2$, wherein the relative refractive index difference, $$\Delta = \frac{n_c - n_1}{n_2} \cdot 100\%,$$

is at least about 0.4%; and an alignment member that receives part of said field fiber, an end of said field fiber abutting against an end of said double-clad optical stub fiber forming an interface at the point of abutment within said fiber optic connector assembly.

2. The fiber optic connector assembly of claim 1, wherein said core has a radius $r_c$, said inner cladding has a radius $r_1$, and said outer cladding has a radius $r_2$, wherein the ratio $r_1:r_c$ is less than 6.5:1.

3. The fiber optic connector assembly of claim 1, wherein said core has a radius $r_c$, said inner cladding has a radius $r_1$, and said outer cladding has a radius $r_2$, wherein the ratio $r_1:r_c$ is less than 4.5:1.

4. The fiber optic connector assembly of claim 1 wherein $n_2$ is greater than $n_1$.

5. The fiber optic connector assembly of claim 1, further comprising a ferrule adjacent said alignment member.

6. The fiber optic connector assembly of claim 5, wherein at least part of said double-clad optical stub fiber is disposed within said ferrule.

7. The fiber optic connector assembly of claim 1, wherein the double-clad optical stub fiber has a low core/clad concentricity error no greater than 0.5 μm.

8. The fiber optic connector assembly of claim 1, wherein the mode field diameter (MFD) of said double-clad optical stub fiber substantially matches the MFD of said field fiber.

9. The fiber optic connector assembly of claim 1, wherein said field fiber is a single-clad optical fiber.

10. The fiber optic connector assembly of claim 1, wherein said field fiber is a double-clad optical fiber.

11. The fiber optic connector assembly of claim 1, wherein said field fiber is of the single-mode type.

12. The fiber optic connector assembly of claim 11, wherein said double-clad optical stub fiber is of the single-mode type.

13. The fiber optic connector assembly of claim 2, wherein said field fiber and said double-clad optical stub fiber are of the single-mode type, and wherein said field fiber is a single-clad optical fiber.

14. A field-terminated pre-polished fiber optic connector assembly for terminating a single-clad, single-mode optical field fiber, comprising:

a double-clad, single-mode optical stub fiber including a core having a radius $r_c$, an inner cladding having a radius $r_1$, and an outer cladding having a radius $r_2$, wherein the ratio $r_1:r_c$ is less than 6.5:1;

said core having an index of refraction $n_c$, said inner cladding having an index of refraction $n_1$, and said outer cladding having an index of refraction $n_2$, wherein the effective relative index difference, $$\Delta = \frac{n_c - n_1}{n_2} \cdot 100\%,$$

is at least about 0.4%; and an alignment member that receives part of said single-clad optical field fiber, an end of said single-clad optical field fiber abutting against an end of said double-clad optical stub fiber such that said ends form an interface at a point of abutment within said fiber optic connector assembly.

15. A method of terminating a single-clad optical field fiber, comprising positioning an end of said field fiber in a field-terminated pre-polished fiber optic connector assembly such that said end of said field fiber abuts against an end of a double-clad optical stub fiber that is at least partially disposed within said fiber optic connector assembly, said double-clad optical stub fiber including a core having a radius $r_c$, an inner cladding having a radius $r_1$, and an outer cladding having a radius $r_2$, wherein the ratio $r_1:r_c$ is less than 6.5:1;

wherein the core has an index of refraction $n_c$, the inner cladding has an index of refraction $n_1$, and the outer cladding has an index of refraction $n_2$, the difference between $n_c$ and $n_1$ being greater than 0.0025 and a relative index difference of the double-clad optical stub fiber, $$\Delta = \frac{n_c - n_1}{n_2} \cdot 100\%,$$

is at least about 0.4%.

16. The method of claim 15, wherein the mode field diameter (MFD) of said double-clad optical stub fiber substantially matches the MFD of said optical field fiber.

* * * * *